United States Patent [19]

Bergmann

[11] Patent Number: 5,641,051

[45] Date of Patent: Jun. 24, 1997

[54] PROCESS AND DEVICE FOR TRANSFERRING WORKPIECE

[75] Inventor: Klaus Bergmann, Melide, Switzerland

[73] Assignee: Mikron SA Agno, Switzerland

[21] Appl. No.: 356,174

[22] PCT Filed: Mar. 24, 1994

[86] PCT No.: PCT/EP94/00940

§ 371 Date: Dec. 16, 1994

§ 102(e) Date: Dec. 16, 1994

[87] PCT Pub. No.: WO94/23893

PCT Pub. Date: Oct. 27, 1994

[30] Foreign Application Priority Data

Apr. 16, 1993 [DE] Germany ............ 43 12 406.2

[51] Int. Cl.⁶ ............ B23Q 7/14; B65G 47/90
[52] U.S. Cl. ............ 198/345.2; 198/470.1; 414/225
[58] Field of Search ............ 198/468.2, 468.4, 198/468.5, 470.1, 471.2, 472.1, 345.2, 478.1, 346.2; 414/222, 225, 786

[56] References Cited

U.S. PATENT DOCUMENTS

| | | | |
|---|---|---|---|
| 3,601,393 | 8/1971 | Hawley | 198/468.4 X |
| 3,823,836 | 7/1974 | Cheney et al. | 414/225 |
| 4,251,957 | 2/1981 | Terahara | 414/225 X |
| 4,556,362 | 12/1985 | Bahnck et al. | 414/225 X |
| 4,685,850 | 8/1987 | Ohta et al. | 414/225 |
| 4,722,298 | 2/1988 | Rubin et al. | 414/222 X |
| 4,764,076 | 8/1988 | Layman et al. | 414/225 X |
| 4,917,556 | 4/1990 | Stark et al. | 198/468.2 X |
| 4,936,329 | 6/1990 | Michael et al. | 414/225 X |
| 4,984,953 | 1/1991 | Nakazato et al. | 414/225 X |
| 4,995,063 | 2/1991 | Enoki et al. | 414/225 X |
| 4,997,330 | 3/1991 | Blezard | 414/225 |
| 5,007,784 | 4/1991 | Genov et al. | 198/471.1 X |
| 5,078,257 | 1/1992 | Carter, Jr. | 198/369 |
| 5,176,241 | 1/1993 | Schaltegger | 198/468.2 X |
| 5,423,648 | 6/1995 | Akeel et al. | 414/225 |
| 5,442,416 | 8/1995 | Tateyama et al. | 414/225 X |
| 5,445,491 | 8/1995 | Nakagawa et al. | 414/222 X |

FOREIGN PATENT DOCUMENTS

| | | |
|---|---|---|
| 2394362 | 1/1979 | France . |
| 1943927 | 3/1971 | Germany . |
| 2505528 | 8/1976 | Germany . |
| 3918235A1 | 12/1990 | Germany . |

OTHER PUBLICATIONS

A. Bilsing, "Interlinking in Forming Technology" *Werkstatt und Bitrieb* 118, (1985) pp. 485–487.

Primary Examiner—David A. Bucci
Attorney, Agent, or Firm—Evenson, McKeown, Edwards & Lenahan P.L.L.C.

[57] ABSTRACT

The novel process and device makes it possible to construct linear transfer installations without a special return transport system for workpieces or workpiece carriers, to keep the number of circulating workpieces or workpiece carriers to a minimum, and to increase or reduce the number of stations in the transfer installation in an arbitrary manner. The invention consists of organizing a flow of parts via an arbitrary number of successive stations by the alternating transfer in pairs between respective adjacent stations so that, as a result, a forward as well as a return movement of workpieces or workpiece carriers is produced. For this purpose, dumbbell-type double transfer devices are used between all stations, and alternate of the transfer devices are operated simultaneously to transfer the workpieces.

20 Claims, 4 Drawing Sheets

| | POSITION | 4 | 3 | 2 | 1 |
|---|---|---|---|---|---|
| STEP 5 | ACTION | IN/OUT STATION | STATION 2 | STATION 3 | STATION 4 |
| | POSITION | 3 | 4 | 1 | 2 |
| STEP 6 | ACTION | IN/OUT STATION | STATION 2 | STATION 3 | STATION 4 |
| | POSITION | 3 | 1 | 4 | 2 |
| STEP 7 | ACTION | IN/OUT STATION | STATION 2 | STATION 3 | STATION 4 |
| | POSITION | 1 | 3 | 2 | 4 |
| STEP 8 | ACTION | IN/OUT STATION | STATION 2 | STATION 3 | STATION 4 |
| END | POSITION | 1 | 2 | 3 | 4 |

Figure 2b

PROCESS AND DEVICE FOR TRANSFERRING WORKPIECE

BACKGROUND AND SUMMARY OF THE INVENTION

The invention relates to a process and a device for implementing the process for the transport of workpieces or workpiece carriers in transfer lines or transfer machines with an arbitrary and also changeable number of stations.

Transfer lines and transfer machines are installations in which workpieces or workpiece carriers are transported from a first station via all other stations to a last station. Normally, in particular, the workpiece carriers must, after their passage, arrive again at the first station, in order to again be entered into the timing of the system. Essentially two methods are known which meet this requirement. The first method is the revolving method carried out by means of the revolving machine which, because of its arrangement, guides the workpieces and workpiece carriers in a circle so that the last station is directly adjacent to the first station. A related form is the transfer line in which the stations are arranged such that the last station is also adjacent to the first station. The second method is the normally linear transfer on transfer lines or on transfer machines in the case of which the last station has a distance from the first station which corresponds approximately to the machine length. For this reason, a return transport must be organized which, in the case of the known constructions, takes place along a different path than the forward transport.

A disadvantage of the revolving machine is the number of stations which are determined as a function of the diameter of the circle and allow no flexibility concerning the increase or decrease of the number of stations. In addition, it often ties up an excessive number of workpiece carriers because the number of its stations may be larger than the number of its productive working stations. Finally, its accessibility is severely limited because of the shape which is closed because it is round. The disadvantage of the linear transfer line or transfer machine is the transport device which is additionally required for the return transport. It results in a doubling of the transport path and thus to an increase of the revolving workpiece carriers.

From German Patent Document DE 39 18 235 A1, an arrangement is known for transfer lines in the case of a processing machines which are equipped with conveying tongs for the timed transfer of the workpieces from one station to the next. In order to compensate processing times of different lengths of individual stations, in the case of the object of German Patent Document DE 39 18 235 A1, a second processing plane is provided which extends in parallel to the timed transfer plane. After two or more timed steps in the transfer plane, two or more workpieces are simultaneously brought from the transfer plane to the longer operating stations in the parallel second processing plane. In this case, the forward and return transfer of the workpieces to be further processed or have already been further processed takes place by means of transfer devices arranged between the two planes irrespective of the timed steps in the transfer plane. Thus, the arrangement of additional transfer devices and the arrangement of a second processing plane are not necessary.

The invention described here avoids the above-mentioned disadvantages. It is based on the object of minimizing the workpieces or workpiece carriers revolving in the system. By means of the invention, preferably linear transfer systems are to be constructed in a modular manner, in which case their number of stations can be increased or reduced arbitrarily. In addition, the invention must not require any special devices for the return transport of the workpieces or workpiece carriers.

According to the invention, this object is achieved in that the forward transport of the workpieces or workpiece carriers from the first station via all subsequent stations to an arbitrary, preferably last station, takes place by means of swivellable transfer devices which are arranged between adjacent stations, and the return transport from this station back to the first station takes place in a continuous flow by an alternating transfer in pairs by means of the same transfer devices and on the same path.

The technical elements which implement the process are dumbbell-type double arms with controllable fastening elements for the workpieces or workpiece carriers to be transferred. These double arms are controlled by a control, preferably a stored-program control (SPC) or a computerized numerical control (CNC), in such a manner that, of the continuously numbered double arms, alternately only the even-numbered or only the odd-numbered double arms are used for the transfer. The total number of dumbbell-type double arms in the transfer line or transfer machine is by 1 smaller than the number of stations. The construction of the transfer line or transfer machine is preferably linear.

In the following, the method of operation of the invention will be explained by means of embodiments which are illustrated in the drawings.

DETAILED DESCRIPTION OF THE DRAWINGS

Figure 1:
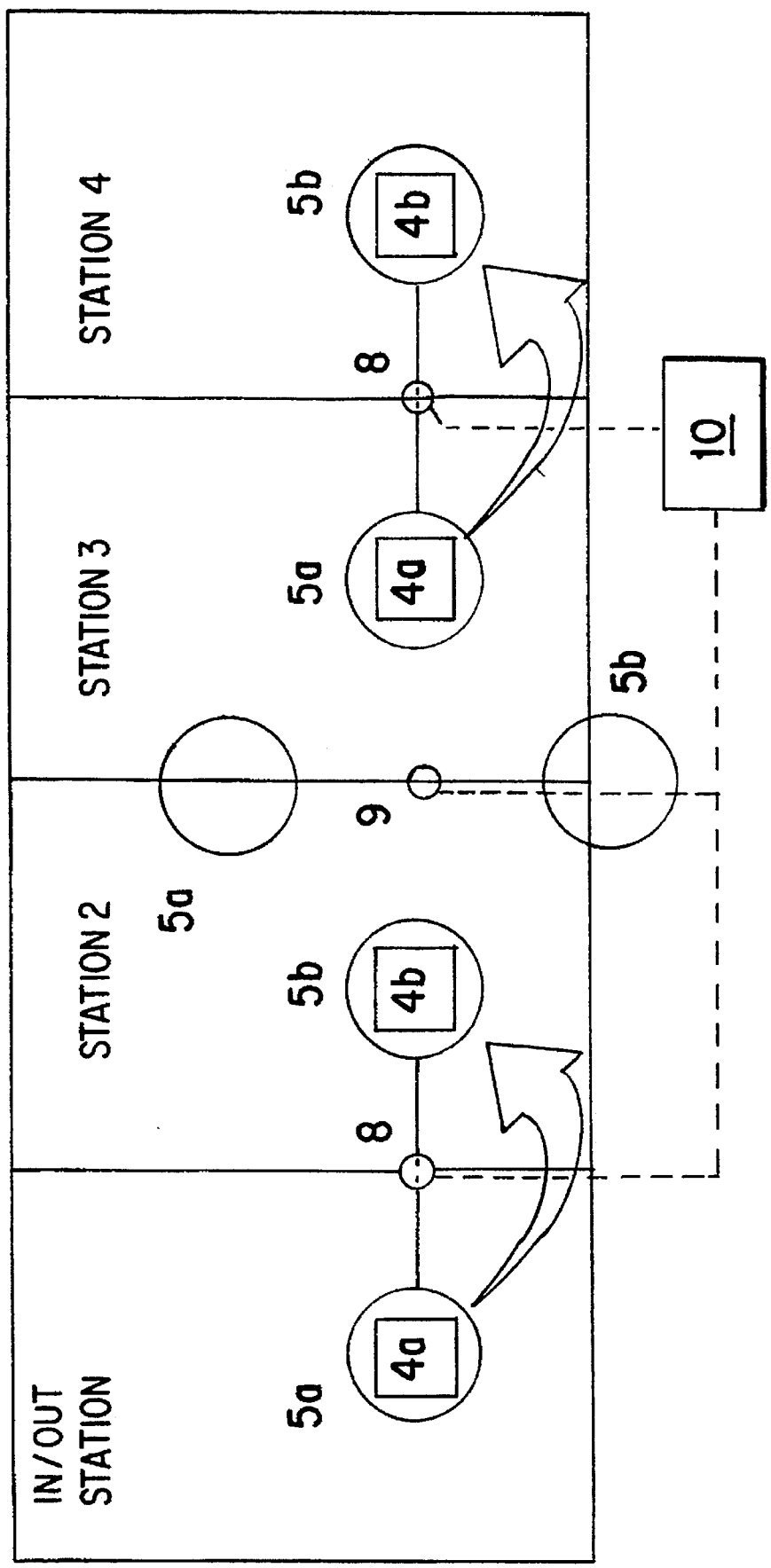
FIG. 1 is a view of a working station with an in/out station which operates according to the invention.

For the alternate transfer in pairs between two adjacent stations, the double arms in FIG. 1 take up in an alternate movement 8 a workpiece or a workpiece carrier 5a, 5b with a workpiece 4a, 4b on both ends. They then carry out a rotation by 180° and deposit the workpieces or workpiece carriers 5a, 5b again. During this time, the adjacent double arm 9 is in the parked position; that is, it carries out no work.

Figure 2A:
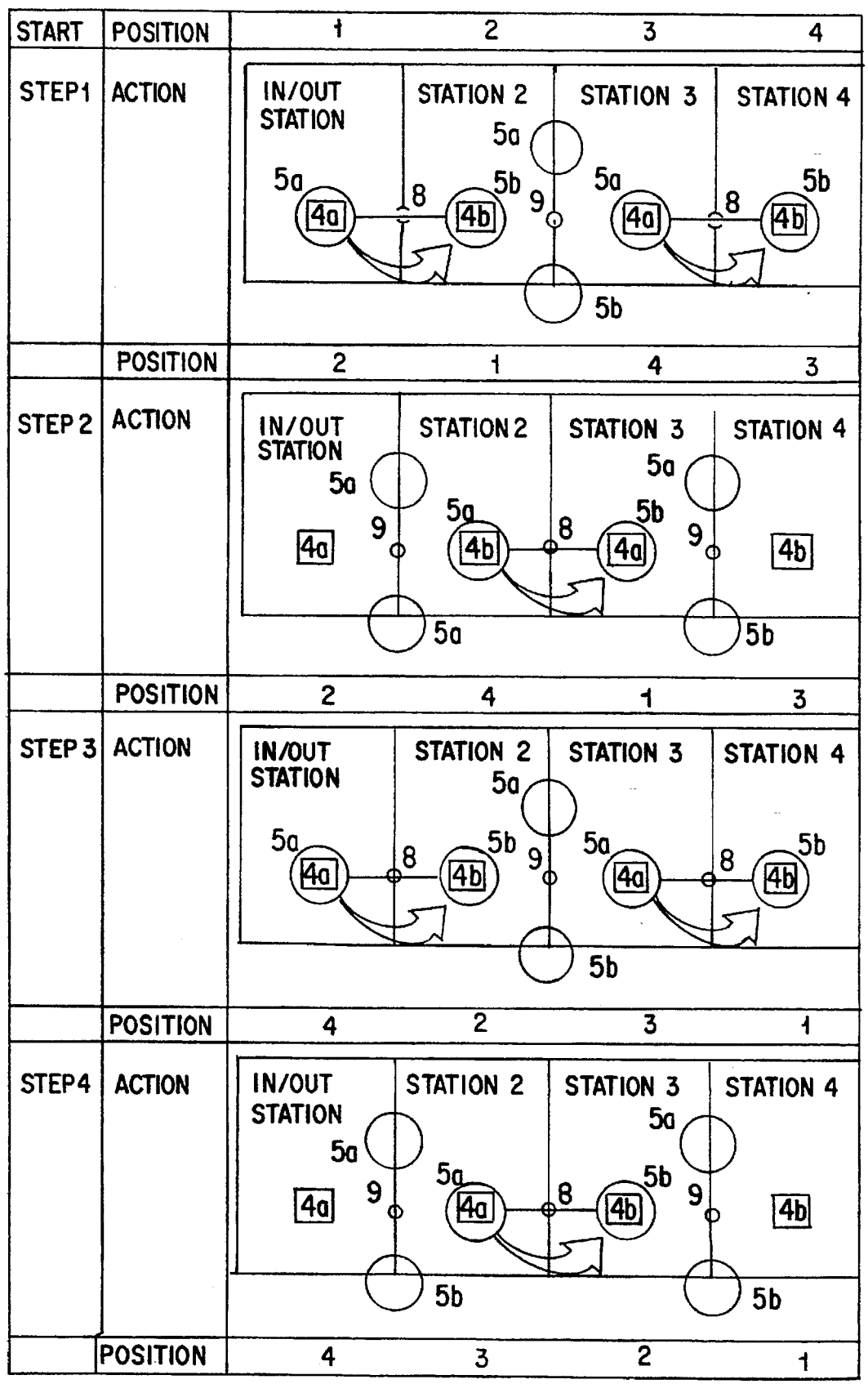
FIG. 2 is a schematic representation of the time sequence of the positions of all stations of a transfer device according to the invention.

The complete machine transfer is built on the basic elements of "double arm in changing position 8" and "double arm in parked position 9". Its sequential course for all parts is illustrated in FIG. 2 by means of the shown example. In the line "condition of workpiece positions", the respective position of the continuously numbered workpieces on the stations is indicated. In the "action" line, the actual transfer operation is indicated in which either the first and the last double arm participate or in which the central double arm participates. After eight steps, all parts will have passed through the line. Parts can be moved in and out during the 2nd, 4th, 6th and 8th action in the in/out station. In order to be able to demonstrate the flow in the manner of an example, workpiece 1 is marked in gray.

Figure 3:
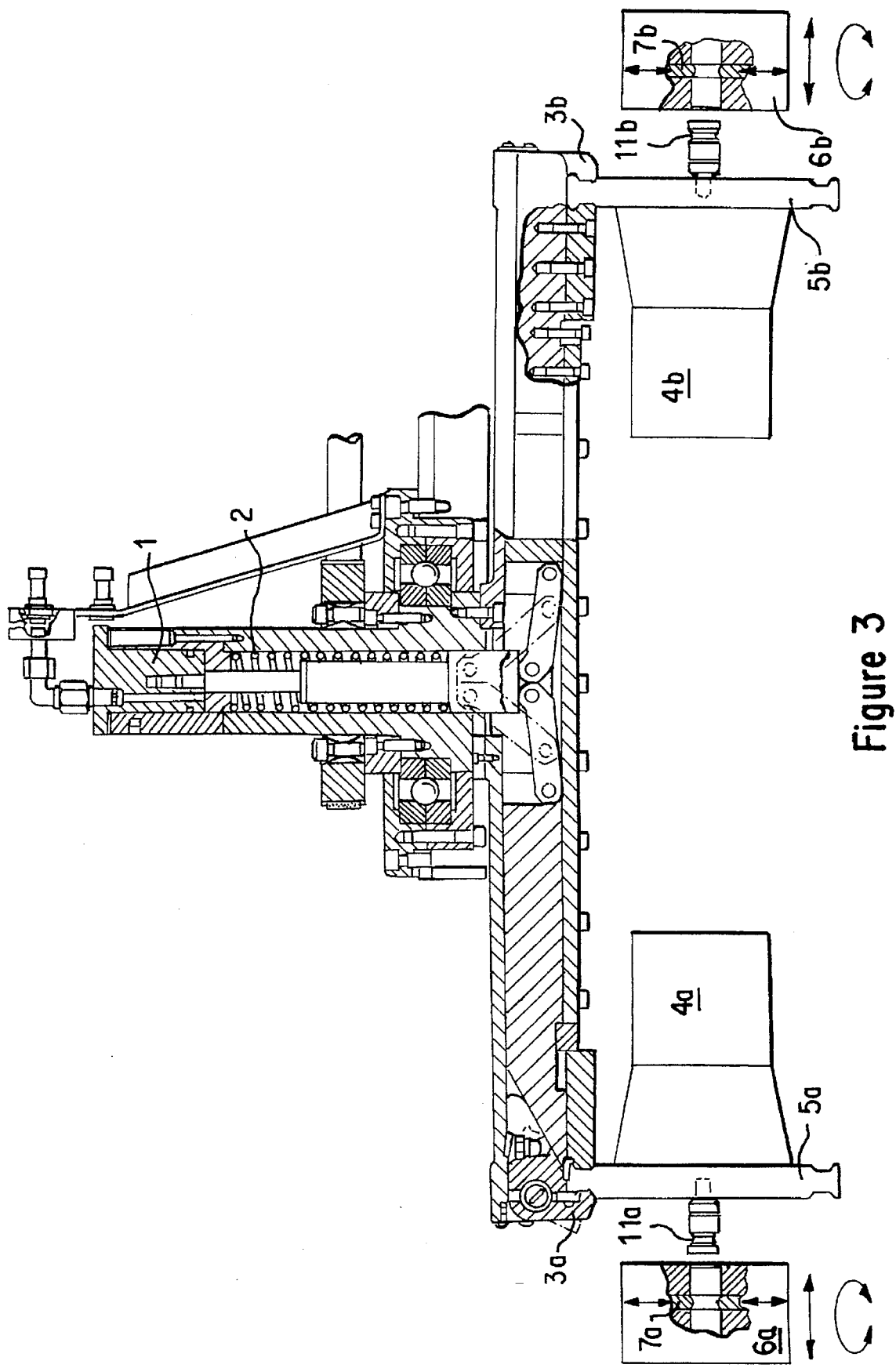
FIG. 3 is a view of an embodiment of a transfer device used for the invention.

A concrete embodiment of the transfer technology is indicated in FIG. 3. It consists of a double arm of the above-mentioned type 8 or 9 and two workpiece carriers 5a, 5b with workpieces 4a, 4b which are temporarily fastened on one station respectively by means of a controllable mechanism. On the ends of the double arm, one pair of tongs or engaging ends 3a, 3b respectively is mounted which is closed by means of a spring 2 and is opened by means of a cylinder 1. On each station, the mechanisms with the workpiece carriers 5a, 5b are held on a support 6a, 6b which can be moved in the transfer direction and can be rotated about its perpendicular axis, as shown by the arrows in FIG. 3. In the drawing, the double gripper with two workpiece carriers is ready to carry out the 180° rotation.

For the changing operation, the double arm is moved out of the parked, or inoperative position into the "double arm in changing movement" position. In this case, its opened tongs 3a, 3b are guided into the fitting grooves of the participating transport pallets and are closed subsequently. By the opening of the mechanism 7a, 7b, the couplings 11a, 11b of the workpiece carriers are now released on the participating stations and the workpiece carrier receiving devices 6a, 6b are withdrawn because of the above-mentioned linear freedom of motion. The condition is now reached which is illustrated in the drawing. The double arm will then be rotated by 180°. After the rotation is completed, the workpiece receiving devices 6a, 6b are moved back to the exchanged workpiece carriers 5a, 5b and are closed. The tongs 3a, 3b of the double arm are opened for releasing the workpiece carriers 5a, 5b, and the double arm is finally moved back into the parked position. For the transfer step which follows, the two supports 6a, 6b are rotated by 180° so that the described constellation is achieved with respect to the two adjacent double arms.

The guiding-in-and-out movement between the workpiece carrier 5a, 5b and the workpiece carrier receiving device 6a, 6b or between the workpiece and the workpiece carrier may also be integrated in the double arm or may be carried out by a perpendicular stroke movement of the double arm or of the supports 6a, 6b if the workpiece carriers 5a, 5b are arranged horizontally. The sequence described for 4 stations can be used for any number of stations in the transfer line. As an expansion of the embodiment, in this case, each second double arm must be used alternately. The corresponding control preferably takes place by means of a programmed control 10.

What is claimed is:

1. Process for a timed transport of workpieces or workpiece carriers in transfer lines or transfer machines comprising an arbitrary number of stations between which the workpieces or workpiece carriers are transferred from one station to another station in an alternate manner by swivellable double arms arranged in alternating odd-numbered and even-numbered order, each of said double arms having opposing engaging ends which are configured to engage respective of said workpieces or workpiece carriers, each of said double arms having an inoperative position in which said engaging ends are disengaged from said workpiece carriers, characterized in that, per transfer stroke, only the even-numbered or the odd-numbered double arms are used, so that, in each case, the double arm in use during the transfer stroke carries out a changing function while the adjacent double arm is in said inoperative position, and the workpieces or workpiece carriers are transported from a first of said stations to an arbitrary station via all of the stations between said first station and said arbitrary station, and the workpieces or workpiece carriers are returned from said arbitrary station to said first station in a reverse sequence of said stations between said first station and said arbitrary station by means of the same double arms.

2. Process according to claim 1, characterized in that the transfer line or transfer machine has a linear arrangement of stations.

3. Device for a timed transport of workpieces or workpiece carriers in transfer lines or transfer machines having an arbitrary number of stations between which the workpieces or workpiece carriers are transferred from one station to another in an alternate manner by swivellable double arms arranged in alternating odd-numbered and even-numbered order, said device having controllable fastening devices for the workpieces or workpiece carriers and having a control, characterized in that the control renders operative in an alternate manner per transfer stroke only the even-numbered or only the odd-numbered double arms, the number of the double arms being by one smaller than the number of stations.

4. Device according to claim 3, characterized in that the double arms carry out rotations whose pivots are situated between two stations respectively.

5. Device according to claim 4, characterized in that all pivots are situated on a straight line.

6. Device according to claim 4, characterized in that the workpieces or workpiece carriers are held on the stations by supports which have freedom of movement in a direction of a straight line described by two adjacent pivots.

7. Process for a timed transport of a plurality of workpiece carriers in a transfer line having an arbitrary number of consecutive stations and a plurality of swivellable double arms arranged in alternating odd-numbered and even-numbered order, each of said double arms having opposing engaging ends which are configured to engage respective of said workpiece carriers, each of said double arms having an inoperative position in which said engaging ends are disengaged from said workpiece carriers, said process comprising the steps of:

(a) engaging said engaging ends of said odd-numbered double arms with respective of said workpiece carriers located at adjacent of said stations, while said even-numbered double arms are in said inoperative position;

(b) swivelling said odd-numbered double arms to simultaneously exchange said respective of said workpiece carriers between said adjacent of said stations, while said even-numbered double arms are in said inoperative position;

(c) disengaging said engaging ends of said odd-numbered double arms;

(d) engaging said engaging ends of said even-numbered double arms with respective of said workpiece carriers located at adjacent of said stations, while said odd-numbered double arms are in said inoperative position;

(e) swivelling said even-numbered double arms to simultaneously exchange said respective of said workpiece carriers between said adjacent of said stations, while said odd-numbered double arms are in said inoperative position;

(f) disengaging said engaging ends of said even-numbered double arms.

8. Process according to claim 7, wherein said stations are arranged linearly.

9. Process according to claim 7, wherein said double arms swivel about respective pivots which are situated between respective adjacent of said stations.

10. Process according to claim 9, wherein said pivots are situated on a straight line.

11. Process according to claim 7, wherein said transfer line has a number of said double arms which is by one smaller than said arbitrary number of stations.

12. Process according to claim 7, wherein said steps (a) through (f) are sequentially repeated in order to transfer one of said workpiece carriers in a forward direction from a first of said stations through each consecutive station to a last of said stations, while simultaneously transferring one of said workpiece carriers in said last of said stations in a reverse direction from said last of said stations through each reverse consecutive station to said first of said stations.

13. Process according to claim 12, wherein said plurality of workpiece carriers corresponds in number to said arbitrary number of stations.

14. Device for performing a timed transport of a plurality of workpiece carriers in a transfer line having an arbitrary number of consecutive stations comprising:

a plurality of swivellable double arms arranged in alternating odd-numbered and even-numbered order, each of said double arms having opposing engaging ends which are configured to engage respective of said workpiece carriers, each of said double arms having an inoperative position in which said engaging ends are disengaged from said workpiece carriers; and a control which controls a swivelling of said double arms and an engaging of said engaging ends according to the following steps:

(a) engaging said engaging ends of said odd-numbered double arms with respective of said workpiece carriers located at adjacent of said stations, while said even-numbered double arms are in said inoperative position;

(b) swivelling said odd-numbered double arms to simultaneously exchange said respective of said workpiece carriers between said adjacent of said stations, while said even-numbered double arms are in said inoperative position;

(c) disengaging said engaging ends of said odd-numbered double arms;

(d) engaging said engaging ends of said even-numbered double arms with respective of said workpiece carriers located at adjacent of said stations, while said odd-numbered double arms are in said inoperative position;

(e) swivelling said even-numbered double arms to simultaneously exchange said respective of said workpiece carriers between said adjacent of said stations, while said odd-numbered double arms are in said inoperative position;

(f) disengaging said engaging ends of said even-numbered double arms.

15. Device according to claim 14, wherein said stations are arranged linearly.

16. Device according to claim 14, wherein said double arms swivel about respective pivots which are situated between respective adjacent of said stations.

17. Device according to claim 16, wherein said pivots are situated on a straight line.

18. Device according to claim 14, wherein said transfer line has a number of said double arms which is by one smaller than said arbitrary number of stations.

19. Device according to claim 14, wherein said control sequentially repeats said steps (a) through (f) in order to transfer one of said workpiece carriers in a forward direction from a first of said stations through each consecutive station to a last of said stations, while simultaneously transferring one of said workpiece carriers in said last of said stations in a reverse direction from said last of said stations through each reverse consecutive station to said first of said stations.

20. Device according to claim 19, wherein said plurality of workpiece carriers corresponds in number to said arbitrary number of stations.

* * * * *